US012615536B2

(12) United States Patent
Lin et al.

(10) Patent No.: US 12,615,536 B2
(45) Date of Patent: Apr. 28, 2026

(54) FEEDBACK TIMING DETERMINATION SCHEMES IN WIRELESS COMMUNICATIONS

(71) Applicant: ZTE Corporation, Shenzhen (CN)

(72) Inventors: Wei Lin, Shenzhen (CN); Li Tian, Shenzhen (CN); Ziyang Li, Shenzhen (CN); Hanqing Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 318 days.

(21) Appl. No.: 18/455,912

(22) Filed: Aug. 25, 2023

(65) Prior Publication Data

US 2023/0413097 A1     Dec. 21, 2023

Related U.S. Application Data

(63) Continuation of application No. PCT/CN2021/111145, filed on Aug. 6, 2021.

(51) Int. Cl.
| | |
|---|---|
| *H04W 72/04* | (2023.01) |
| *H04L 1/1829* | (2023.01) |
| *H04W 24/10* | (2009.01) |
| *H04W 72/0446* | (2023.01) |
| *H04W 72/1268* | (2023.01) |

(52) U.S. Cl.
CPC ........... *H04W 24/10* (2013.01); *H04L 1/1854* (2013.01); *H04W 72/0446* (2013.01); *H04W 72/1268* (2013.01)

(58) Field of Classification Search
CPC ............. H04W 24/10; H04W 72/0446; H04W 72/1268; H04L 1/1854; H04L 1/1864; H04L 5/0055
See application file for complete search history.

(56) References Cited

U.S. PATENT DOCUMENTS

| | | | |
|---|---|---|---|
| 12,137,460 B2 * | 11/2024 | El Hamss ............. | H04W 72/23 |
| 2022/0346104 A1 * | 10/2022 | Yi .......................... | H04L 1/1614 |
| 2024/0236985 A1 * | 7/2024 | Lei ........................ | H04L 1/1812 |

FOREIGN PATENT DOCUMENTS

| | | | | |
|---|---|---|---|---|
| CN | 109792700 A | 5/2019 | | |
| CN | 110140322 A | 8/2019 | | |
| EP | 4024745 A1 * | 7/2022 | ............ | H04W 72/23 |
| WO | 2020005586 A1 | 1/2020 | | |

OTHER PUBLICATIONS

LG Electronics, "PDSCH/PUSCH enhancements to support NR above 52.6 GHz," 3GPP TSG RAN WG1 #105-e R1-2105421, e-Meeting, May 10-27, 2021 (18 pages) (Year: 2021).*

(Continued)

*Primary Examiner* — Lan-Huong Truong
(74) *Attorney, Agent, or Firm* — Perkins Coie LLP

(57) ABSTRACT

A method of wireless communication is described. The method includes obtaining, by a user device, a parameter set used to determine a feedback timing, the parameter set including N elements; and modifying the parameter set to include M elements, M being greater than N, based on a time domain resource assignment table that includes information on multiple physical downlink shared channel receptions, whereby N and M are positive integers.

18 Claims, 3 Drawing Sheets

100

Obtaining, by a user device, a parameter set used to determine a feedback timing, the parameter set including N elements

110

Modifying the parameter set to include M elements, M being greater than N, based on a time domain resource assignment table that includes information on multiple physical downlink shared channel receptions, whereby N and M are positive integers

120

(56)         References Cited

OTHER PUBLICATIONS

CATT, "PDSCH/PUSCH enhancements for up to 71GHz operation," 3GPP TSG RAN WG1 #105-e, R1-2104509, e-Meeting, May 19-27, 2021 (11 pages).

Extended European Search Report for European Patent Application No. 21952387.5, mailed Mar. 12, 2024 (10 pages).

International Search Report and Written Opinion for Application No. PCT/CN2021/111145, mailed on Apr. 28, 2022, 8 pages.

ZTE Corporation, "PRB alignment for multiple numerologies," 3GPP TSG-RAN WG4 meeting Ad Hoc#1801, R4-1800335, San Diego, California, USA, Jan. 22-Jan. 26, 2018.

Futurewei, "Enhancements to support PDSCH/PUSCH for beyond 52.6GHz," 3GPP TSG RAN WG1 Meeting #105-e, R1-2104212, eMeeting, May 19-May 27, 2021 (12 pages).

Vivo, "Discussions on multi-PDSCH/PUSCH scheduling for NR operation from 52.6GHz to 71GHz," 3GPP TSG RAN WG1 #105-e, R1-2104350, e-Meeting, May 10-27, 2021 (15 pages).

Nokia et al., "PDSCH/PUSCH enhancements," 3GPP TSG RAN WG1 #105-e, R1-2104454, e-Meeting, May 10-27, 2021 (11 pages).

Ericsson, "PDSCH/PUSCH enhancements," 3GPP TSG-RAN WG1 Meeting #105-e, Tdoc R1-2104462, e-Meeting, May 10-27, 2021 (26 pages).

Qualcomm Inc., "PDSCH and PUSCH enhancements for 52.6-71GHz band," 3GPP TSG-RAN WG1 #105-e, R1-2104661, e-Meeting, May 10-May 27, 2021 (9 pages).

Oppo, "Discussion on PDSCH/PUSCH enhancements," 3GPP TSG RAN WG1 #105-e, R1-2104767, e-Meeting, May 10-27, 2021 (7 pages).

Intel Corporation, "Discussion on PDSCH/PUSCH enhancements for extending NR up to 71 GHz," 3GPP TSG RAN WG1 #105-e, R1-2104896, e-Meeting, May 19-27, 2021 (9 pages).

Fujitsu, "Considerations on multi-PDSCH/PUSCH with a single DCI and HARQ for NR from 52.6 GHz to 71 GHz," 3GPP TSG RAN WG1 #105-e, R1-2105062, e-Meeting, May 10-27, 2021 (13 pages).

Apple Inc., "Discussion on multi-PxSCH and HARQ Codebook Enhancements," 3GPP TSG RAN WG1 #104b-e, R1-2105094, e-Meeting, Apr. 12-20, 2021 (17 pages).

Sony, "PDSCH/PUSCH enhancements for NR from 52.6 GHz to 71 GHz," 3GPP TSG RAN WG1 #105-e, R1-2105158, e-Meeting, May 10-27, 2021 (8 pages).

Samsung, "PDSCH/PUSCH enhancements for NR from 52.6 GHz to 71 GHz," 3GPP TSG RAN WG1 #105-e R1-2105299, e-Meeting, May 10-27, 2021 (13 pages).

Panasonic, "Discussion on PDSCH/PUSCH enhancements for NR 52.6-71 GHz," 3GPP TSG RAN WG1 #105e, R1-2105396, e-Meeting, May 10-27, 2021 (6 pages).

LG Electronics, "PDSCH/PUSCH enhancements to support NR above 52.6 GHz," 3GPP TSG RAN WG1 #105-e R1-2105421, e-Meeting, May 10-27, 2021 (18 pages).

Lenovo et al., "PDSCH/PUSCH scheduling enhancements for NR from 52.6 GHz to 71GHz," 3GPP TSG RAN WG1 #105-e, R1-2105497, e-meeting, May 10-27, 2021 (8 pages).

NTT Docomo, Inc., "PDSCH/PUSCH enhancements for NR from 52.6 to 71 GHz," 3GPP TSG RAN WG1 Meeting #105-e, R1-2105690, Electronic Meeting, May 10-27, 2021 (10 pages).

Communication under Rule 71(3) EPC for European Patent Application No. 21952387.5, mailed Feb. 17, 2026 (8 pages).

* cited by examiner

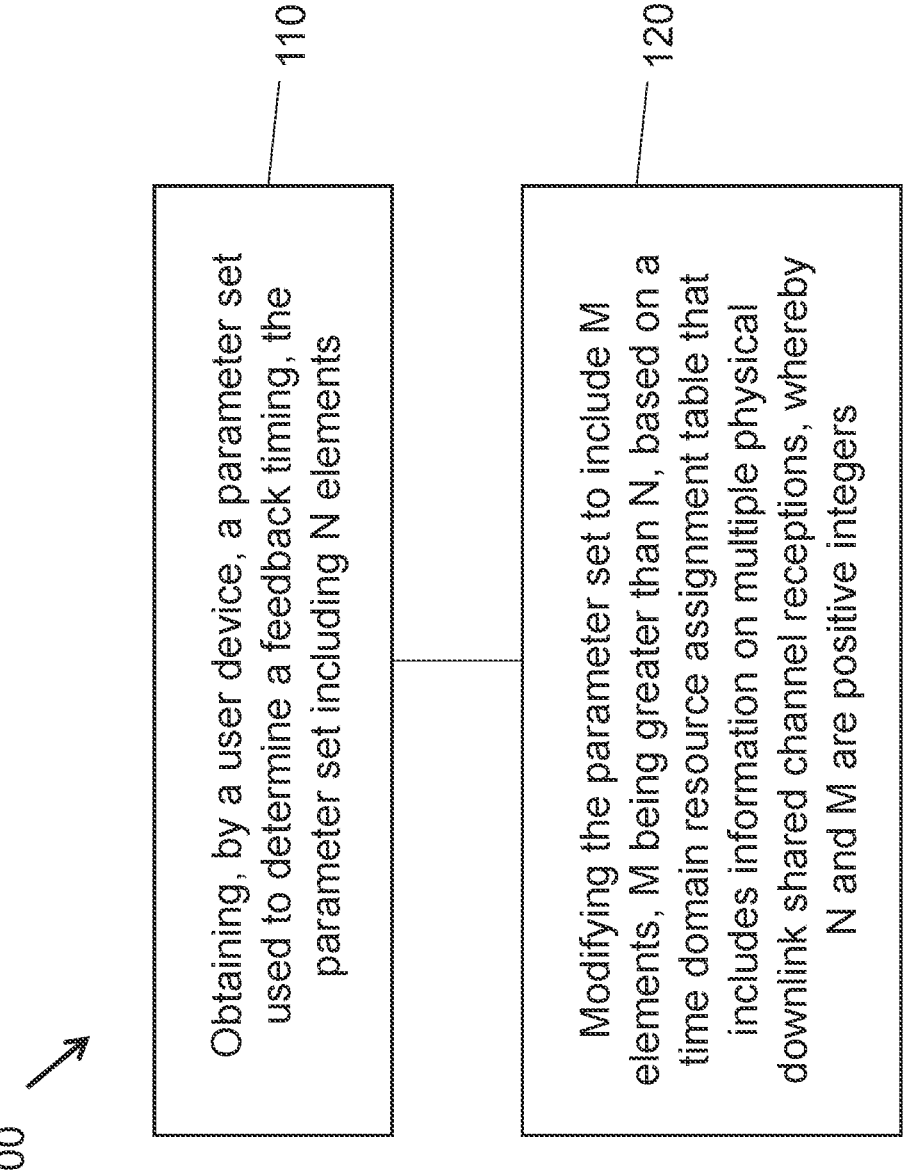

100

110

Obtaining, by a user device, a parameter set used to determine a feedback timing, the parameter set including N elements

120

Modifying the parameter set to include M elements, M being greater than N, based on a time domain resource assignment table that includes information on multiple physical downlink shared channel receptions, whereby N and M are positive integers

*FIG. 1*

FEEDBACK TIMING DETERMINATION SCHEMES IN WIRELESS COMMUNICATIONS

CROSS REFERENCE TO RELATED APPLICATIONS

This patent document is a continuation of and claims benefit of priority to International Patent Application No. PCT/CN2021/111145, filed on Aug. 6, 2021. The entire content of the before-mentioned patent application is incorporated by reference as part of the disclosure of this application.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for cell measurement reporting schemes in wireless communications.

In one aspect, a wireless communication method is disclosed. The wireless communication method includes obtaining, by a user device, a parameter set used to determine a feedback timing, the parameter set including N elements; and modifying the parameter set to include M elements, M being greater than N, based on a time domain resource assignment table that includes information on multiple physical downlink shared channel receptions, whereby N and M are positive integers.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

These, and other features, are described in the present document.

BRIEF DESCRIPTION OF THE DRAWING

FIG. 1 shows an example method of wireless communication based on some implementations of the disclosed technology.

DETAILED DESCRIPTION

Figure 2:
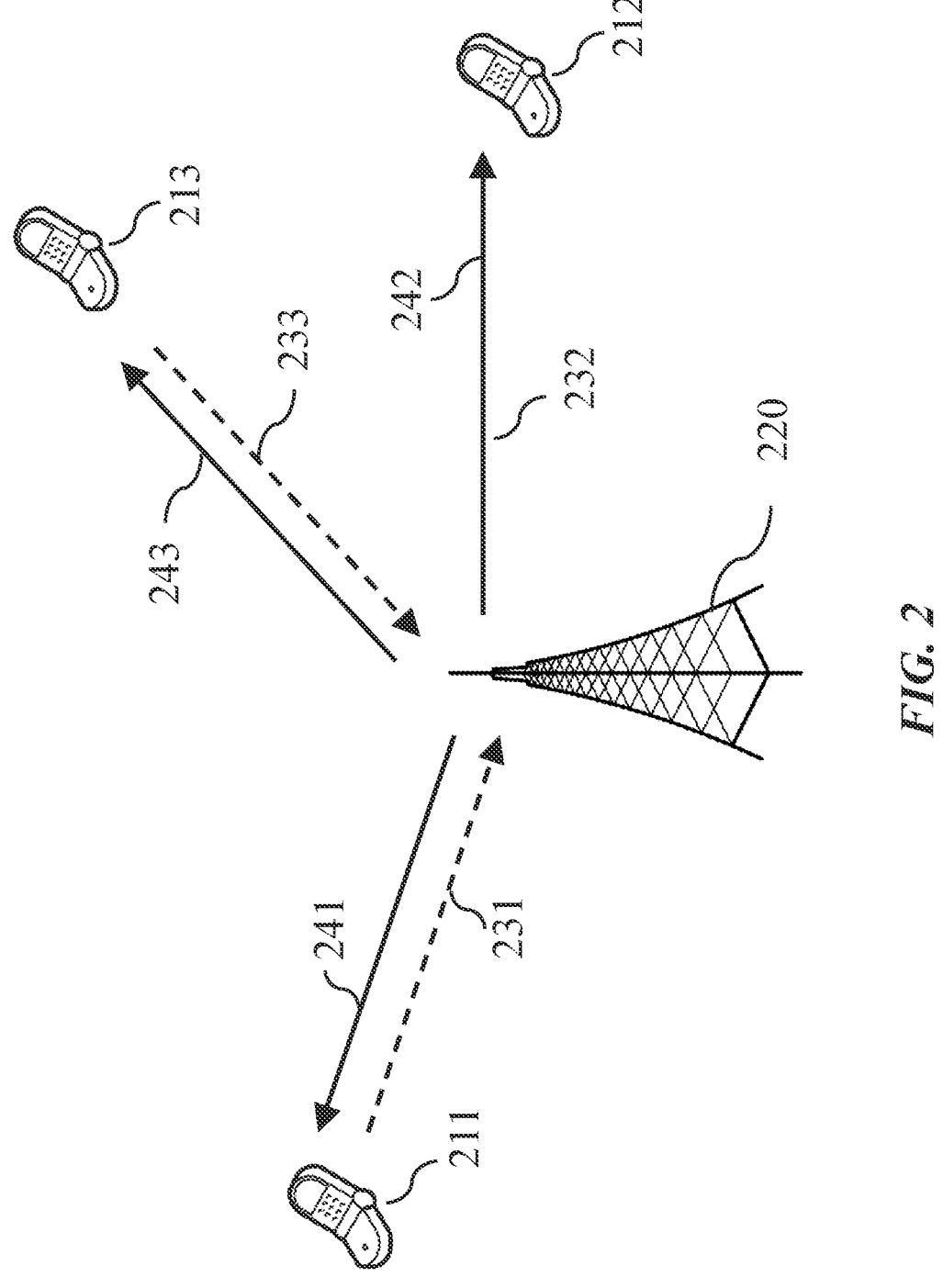
FIG. 2 shows an example of wireless communication including a base station (BS) and user equipment (UE) based on some implementations of the disclosed technology.

The disclosed technology provides implementations and examples that are related to determining a hybrid automatic repeat request-acknowledgement (HARQ-ACK) feedback timing. While 5G terminology is used in some cases to facilitate understanding of the disclosed techniques, which may be applied to wireless systems and devices that use communication protocols other than 5G or 3GPP protocols.

In FR 2-2 (52.6-71 GHz), HARQ-ACK information reported by a user equipment (UE) needs to be enhanced for multiple PDSCHs (Physical Downlink Shared Channels). The HARQ-ACK feedbacking timing can be configured based on values of the parameter set, which is referred to as K1 set. K1 set includes K1 values, each indicating a slot offset between a corresponding PDSCH/PDCCH (Physical Downlink Control Channel) slot and feedback (e.g., ACK) slot. For example, the K1 set for DCI 1_0 is a default set of $\{1, 2, 3, 4, 5, 6, 7, 8\}$ and the K1 set for DCI 1_1 and 1_2 is configured by RRC (Radio Resource Control) parameters of dl-DataToUL-ACK or dl-DataToUL-ACK-r16 and dl-DataToUL-ACK-DCI-1-2-r16, respectively. The range of the RRC parameters is [0,15] but the maximal elements of the extension of the K1 set can beyond 15.

One of the enhanced methods that are needed for the multiple PDSCHs is to extend the K1 set that specifies HARQ-ACK feedback timing. Until now, however, there is no specific scheme to extend the K1 set. In addition, there is no available scheme to know which set of PDSCH reception is associated with the specific element of the extended K1 set. This patent document provides various solutions to extend the K1 set based on the time domain resource assignment (TDRA) table and K1 set provided by network.

In FR 2-2 (52.6-71 GHz), a single DCI can schedule multiple PDSCHs and the multiple PDSCHs can be non-continuous in time-domain. For the enhancements of generating semi-static HARQ-ACK codebook corresponding to single DCI scheduling multiple PDSCHs, the set of candidate PDSCH reception occasions corresponding to a UL slot with HARQ-ACK transmission is determined based on a set of DL slots and a set of SLIVs corresponding to each DL slot belonging to the set of DL slots. The set of DL slots includes all the unique DL slots that can be scheduled by any row index r of TDRA table in DCI indicating the UL slot as HARQ-ACK feedback timing. The set of SLIVs (Start and Length Indicator Values) corresponding to a DL slot (belonging to the set of DL slots) at least include all the SLIVs that can be scheduled within the DL slot by any row index r of TDRA table in DCI indicating the UL slot as HARQ-ACK feedback timing.

The current specification used to generate a semi-static HARQ-ACK codebook can apply to a single DCI scheduling a single PDSCH or PDSCH repetition only and has limitations to be applied to a single DCI scheduling multiple PDSCHs. In order to reuse the current specification for the single DCI scheduling multiple PDSCHs, some implementations of the disclosed technology suggest generating a semi-static HARQ-ACK codebook based on the extended K1 set used to determine HARQ-ACK feedback timing.

In this patent document, some implementations preprocess the HARQ-ACK feedback timing by providing an extended parameter set for HARQ-ACK feedback timing as compared to the one used for the single DCI scheduling a single PDSCH. Each element of the extended parameter set for HARQ-ACK feedback timing is associated with a set of SLIVs or PDSCH reception.

Implementation 1

This implementation describes how to extend the K1 set for PDSCH-to-HARQ_feedback timing based on the default or configured K1 set. The PDSCH-to-HARQ_feedback timing is also called HARQ-ACK timing or HARQ-ACK feedback timing and the element of K1 set is described as k in the following descriptions.

With reference to slots for PUCCH (physical uplink control channel) transmissions, if the UE detects a DCI format scheduling a PDSCH reception ending in slot n or if the UE detects a DCI format indicating a SPS (semi-persistent scheduling) PDSCH release or indicating SCell dormancy through a PDCCH reception ending in slot n, or if the UE detects a DCI format that requests Type-3 HARQ-ACK codebook report and does not schedule a PDSCH reception through a PDCCH reception ending in slot n, the UE provides corresponding HARQ-ACK information in a associated with all the row indices of TDRA table, and a set of K1 (hereinafter 'K1 set') includes all default or configured PDSCH-to-HARQ_feedback timing values. The last PDSCH is the last scheduled PDSCH in a row index of TDRA table in time domain and the slot offset value (k_offset) for the last PDSCH reception is If a row index can indicate multiple PDSCH and each PDSCH corresponds to a SLIV and scheduling offset K0, k_offset is the K0 of last PDSCH reception minus the K0 of the PDSCH reception when the last PDSCH reception and the PDSCH reception belongs to the same row index of TDRA table.

In this implementation, the extended K1 set (K1_e set) has more elements than those included in the K1 set. Thus, the K1 set is a subset of the extended K1 set. The extended K1 set (K1_e set) is determined based on the TDRA table and K1 set. The element of the extended K1 set is referred to as k_e and k_e equals to k+k_offset for all the possible (k, k_offset) combination.

Table 1-1 describes an example of TDRA which includes multiple PDSCH transmissions.

TABLE 1-1

| Example of TDRA which includes multiple PDSCH and K1 = {1, 5, 8, 13} TDRA | | | | |
|---|---|---|---|---|
| row index = 0 | K0 = 1&R0__0 | K0 = 2&R0__1 | K0 = 4&R0__2 | K0 = 5&R0__3 |
| row index = 1 | K0 = 1&R1__0 | | | |
| row index = 2 | K0 = 1&R2__0 | K0 = 2&R2__1 | | |

PUCCH transmission within slot n+k, where k is a number of slots and is indicated by the PDSCH-to-HARQ_feedback timing indicator field in the DCI format, if present, or provided by dl-DataToUL-ACK, dl-DataToUL-ACK-r16, or dl-DataToUL-ACKForDCIFormat1 _2.

When the UE is scheduled to receive PDSCH by a DCI, the Time domain resource assignment field value r of the DCI provides a row index r+1 to an allocation table which is called time domain resource assignment (TDRA) table.

For a single DCI scheduling multiple PDSCHs, a row index of TDRA table directly or implicitly defines the slot offset K0 and the start and length indicator (SLIV) for each PDSCH reception. K0 indicates the slot offset between the downlink (DL) slot where the physical downlink control channel (PDCCH) carrying the DCI is received and the DL slot where PDSCH data is scheduled. In some cases, the start and length indicator (SLIV) can be replaced by the start symbol S and the allocation length L. In some cases, the start and length indicator (SLIV) corresponds to a PDSCH reception.

For a single DCI that can schedule multiple PDSCHs, the slot offset value (hereinafter 'k_offset') for a PDSCH reception with a row index of TDRA table corresponds the slot offset relative to the last PDSCH reception with the same row index of TDRA table. The last PDSCH reception with a row index of TDRA table corresponds to the PDSCH reception whose order is the last in the time domain among PDSCH receptions with the same row index of TDRA table. For the last PDSCH reception, the slot offset value is 0. For other PDSCH receptions than the last PDSCH reception, the slot offset value (k_offset) corresponds to the slot offset between the last PDSCH reception with a row index of TDRA table and one of other PDSCH receptions with the same row index of TDRA table. The slot offset set (hereinafter 'k_offset set') includes all slot offset values (k_offsets)

For example, in Table 1-1, for the row index 0, four PDSCH receptions exist, which are indicated by K0=1&R0_0, K0=2&R0_1, K0=4&R0_2, K0=5&R0_3, respectively. In Table 1-1, "K0=x&Rr_y" indicates a PDSCH reception where 'r' indicates the row index and 'y' indicates the order of the PDSCH reception with a same row index 'r'. For the row index 0, the last PDSCH reception is K0=5&R0_3 since K0=5&R0_3 is the last PDSCH in the time domain with the greatest value of K0, which is 5, among the PDSCH receptions with the row index 0. According to the slot offset K0 and the slot of scheduling DCI, the slot of the scheduling PDSCH can be achieved. If the scheduled DCI is in slot n and the slot offset for the scheduled PDSCH is K0, the scheduled PDSCH is allocated in the slot n+K0 when the subcarrier spacing configuration for PDSCH and PDCCH is same. For the row index r=0, the slot offset between the last PDSCH reception and the PDSCH reception, K0=4&R0_2, is 1, which is obtained by subtracting the K0 value (i.e., 4) of the PDSCH reception, K0=4&R0_2, from the K0 of the last PDSCH reception (i.e., 5), and the slot offset between the last PDSCH reception and the PDSCH reception, K0=2&R0_1, is 3, which is obtained by subtracting the K0 value (i.e., 2) of the PDSCH reception, K0=2&R0_1, from the K0 of the last PDSCH reception (i.e., 5), and the slot offset between the last PDSCH reception and the PDSCH reception, K0=1&R0_0, is 4, which is obtained by subtracting the K0 value (i.e., 1) of the PDSCH reception, K0=1&R0_0, from the K0 of the last PDSCH reception (i.e., 5). Therefore, the slot offset values (k_offset) for row index r=0 is 0, 1, 3 and 4. Similarly, the slot offset values (k_offset) for row index r=1 is 0 and the slot offset values (k_offset) for row index r=2 is 0 and 1. Accordingly, the slot offset set (k_offset set) for the TDRA table as shown in Table 1-1 is {0, 1, 3, 4}.

As one example, it is assumed that the K1 set is configured as {1,5,8,13} by RRC (Radio Resource Control). Table 1-2 show the elements (k_e) of the extended K1 set (K1_e set). The element (k_e) of the extended K1 set (K1_e set) corresponds to a sum of an element of the K1 set and an element of the slot offset set. The extended K1 set includes all possible sums of the elements of the K1 set and the elements of the slot offset set. In the example as shown in Table 1-2, for k=1 and k_offset=1, k_e=k+k_offset=2. Similarly, the elements of the extended K1 set can be determined for different combinations of (k, k_offset), as shown in Table 1-2. The extended K1 set can be expressed as K1_e={ 1, 2, 4, 5, 6, 8, 9, 11, 12, 13, 14, 16, 17}.

TABLE 1-2 k_e for different (k_offset, k) combination

| k_offset | k | | | |
|---|---|---|---|---|
| | 1 | 5 | 8 | 13 |
| 0 | 1 | 5 | 8 | 13 |
| 1 | 2 | 6 | 9 | 14 |
| 3 | 4 | 8 | 11 | 16 |
| 4 | 5 | 9 | 12 | 17 |

The extended K1 set, K1_e={ 1, 2, 4, 5, 6, 8, 9, 11, 12, 13, 14, 16, 17}, has more elements than the K1 set, K1={1,5, 8,13} and the elements of the K1 set are all included in the extended K1 set, K1_e.

Implementation 2

This implementation provides a simplified scheme (as compared to the implementation 1) to extend the K1 set for the PDSCH-to-HARQ_feedback timing based on the default or configured K1 set and TDRA table.

For a single DCI that can schedule multiple PDSCHs, k_offset corresponds to the slot offset between the last PDSCH reception and the other PDSCH reception which belongs to the same row index of TDRA table and the row index can indicate more than one SLIVs or PDSCH receptions. The k_offset_max corresponds to the maximal k_offset among all the row indices of TDRA table.

In this implementation, the extended K1 set (K1_e set) for PDSCH-to-HARQ_feedback timing is determined based on the maximal slot offset k_offset_max and the K1 set where K1 set is a subset of the extended K1 set (K1_e). The maximal element of the K1 set is referred to as k_max and the minimal element of the K1 set is referred to as k_min. The maximal element of K1_e equals k_max+k_offset_max and the minimal element of K1_e is k_min. The extended K1 set (K1_e set) contains all the integer from k_min to k_max+k_offset_max.

For example, in Table 2-1, the K1 set is configured as {5, 8, 13}. Thus, k_min equals to 5 and k_max equals to 13. Since k_offset set is {0, 1, 3, 4}, the k_offset_max is 4. In this case, the minimal element of K1_e is 5 and the maximal element of K1_e is k_max+k_offset_max=17, which makes K1_e={5, 6, 7, 8, 9, 10, 11, 12, 13, 14, 15, 16, 17}.

TABLE 2-1

Example of TDRA which includes multiple PDSCH and K1 = {5, 8, 13}
TDRA

| index = 0 | K0 = 1&R0_0 | K0 = 2&R0_1 | K0 = 4&R0_2 | K0 = 5&R0_3 |
| index = 1 | K0 = 1&R1_0 | | | |
| index = 2 | K0 = 1&R2_0 | K0 = 2&R2_1 | | |

Implementation 3

This implementation describes how to determine an association between the element of the extended K1 set (K1_e set) for the PDSCH-to-HARQ_feedback timing and the PDSCH reception set. Although the implementation is described to determine the association between the element of the extended K1 set (K1_e set) for the PDSCH-to-HARQ_feedback timing and the PDSCH reception set, the implementation can be applied to determine the association between the element of the extended K1 set (K1_e set) for the PDSCH-to-HARQ_feedback timing and the SLIV set.

One element of the extended K1 set (K1_e set) can be used to determine HARQ-ACK feedback timing for one of the multiple PDSCHs scheduled by a single DCI, while one element of the K1 set is used to determine HARQ-ACK feedback timing for all of the multiple PDSCHs. The current specification used to generate a semi-static HARQ-ACK codebook for a single DCI scheduling a single PDSCH or PDSCH repetition can be applied as well for generating a semi-static HARQ-ACK codebook for a single DCI scheduling multiple PDSCHs by using the extended K1 set. For generating semi-static HARQ-ACK codebook to a single DCI scheduling a single PDSCH or PDSCH repetition, each element of K1 set is associated with a set of SLIVs (SLIV set) which includes all the SLIVs in the TDRA table in the procedure to determine a set of occasions for candidate PDSCH receptions. However, for generating semi-static HARQ-ACK codebook for a single DCI scheduling multiple PDSCHs, each element of the extended K1 set (K1_e set) cannot be associated with a set of SLIVs which includes all the SLIVs in the TDRA table to determine a set of occasions for candidate PDSCH receptions since this may cause a lot of redundant feedback overhead. Therefore, an effective method is needed to determine the association between the element of the extended K1 set (K1_e set) and a set of SLIVs or PDSCH reception set. The present implementation (and also Implementation 4 which is to be discussed later in this specification) discusses such method to determine the association between the element of K1_e set and a SLIV set or PDSCH reception set.

Each slot offset value (k_offset) is associated with one or more PDSCH receptions and thus the extended K1 set (K1_e set) determined based on the k_offset is also associated with one or more PDSCH receptions which are associated with the slot offset value (k_offset). In some implementations, the PDSCH reception can be represented by a corresponding SLIV. The PDSCH reception set associated with a slot offset value (k_offset) is indicated as R_k_offset (k_offset). If the slot offset between the last PDSCH reception and the PDSCH reception (Rr_x) with the row index 'r' of TDRA table is k_offset, the PDSCH reception of the PDSCH reception (Rr_x) is included in the PDSCH reception set which is indicated as R_k_offset(k_offset). For example, the slot offset value (k_offset) for the last PDSCH reception itself is 0 and the PDSCH reception set corresponding to the offset value '0' (R_k_offset(0)) includes all the last PDSCH receptions of each row of TDRA table.

The element (k_e) of the extended K1 set (K1_e set) for HARQ-ACK feedback timing may extend based on more than one slot offset values (k_offset) when there exist more than one (k, k_offset) combination that can achieve the same value of k_e. In this implementation, the PDSCH reception set associated with the element of the extended K1 set (k_e), which is indicated as (R(k_e)), is the union of all the PDSCH reception set associated with all the slot offset values(k_offset), which is indicted as R_k_offset (k_offset).

According to an element (k_e) of the extended K1 set (K1_e set) and the PDSCH reception set associated with the element of the extended K1 set, R(k_e), the procedure of generating semi-static HARQ-ACK codebook for a single DCI scheduling a single PDSCH or PDSCH repetition can be reused to generate semi-static HARQ-ACK codebook for a single DCI scheduling multiple PDSCH receptions. For generating semi-static HARQ-ACK codebook for a single DCI scheduling a single PDSCH or PDSCH repetition, the element (k) of the K1 set is associated with all the PDSCH receptions or SLIVs in the TDRA table in the procedure to determine a set of occasions for candidate PDSCH receptions. However, for generating semi-static HARQ-ACK codebook for a single DCI scheduling multiple PDSCH receptions, the element (k_e) of the extended K1 set (K1_e set) is associated with the PDSCH reception set or SLIV set of R(k_e) in the procedure to determine a set of occasions for candidate PDSCH receptions when the procedure of generating semi-static HARQ-ACK codebook for a single DCI scheduling a single PDSCH or PDSCH repetition is reused. The procedures reused in generating semi-static HARQ-ACK codebook for a single DCI scheduling multiple PDSCH receptions include that determine whether at least one symbol of a PDSCH time resource is configured as UL and whether a slot include more than one candidate PDSCH receptions according to k_e and the PDSCH reception set or SLIV set associated with k_e. The reuse of the procedure in this patent document means that the procedure of generating semi-static HARQ-ACK codebook for a single DCI scheduling multiple PDSCH receptions is same as that for a single DCI scheduling a single PDSCH or PDSCH repetition reception. Thus, the current specification used to generate a semi-static HARQ-ACK codebook for a single DCI scheduling a single PDSCH or PDSCH repetition can be applied to the single DCI scheduling multiple PDSCH receptions as well.

For example, in the TDRA table as shown in Table 1-1, k_offset=0 is associated with the PDSCH receptions of K0=5&R0_3, K0=1&R1_0 and K0=2&R2_1 for row index r=0, 1 and 2 and the PDSCH reception set associated with k_offset=0, which is indicated as R_k_offset(0) is {K0=5&R0_3, K0=1&R1_0, K0=2&R2_1}. Similarly, k_offset=1 is associated with the PDSCH receptions of K0=4&R0_2 and K0=1&R2_0 for row index r=0 and 2 and the PDSCH reception set associated with k_offset=1 is {K0=4&R0_2, K0=1&R2_0}. Similarly, k_offset=3 is associated with the PDSCH receptions of K0=2&R0_1 for row index r=0 and the PDSCH reception set associated with k_offset=3 is {K0=2&R0_1}. Similarly, k_offset=4 is associated with the PDSCH receptions of K0=1&R0_0 for row index r=0 and the PDSCH reception set associated with k_offset=4 is {K0=1&R0_0}. Table 3-1 shows the PDSCH reception set associated with k_offset, which is R_k_offset (k_offset) set.

TABLE 3-1

| PDSCH reception set associated with k_offset | |
|---|---|
| R_k_offset(0) | K0 = 5&R0_3, K0 = 1&R1_0, K0 = 2&R2_1 |
| R_k_offset(1) | K0 = 4&R0_2, K0 = 1&R2_0 |
| R_k_offset(3) | K0 = 2&R0_1 |
| R_k_offset(4) | K0 = 1&R0_0 |

The PDSCH reception set, R(k_e), which is associated with the element (k_e) of the extended K1 set, is shown in Table 3-2. The PDSCH reception set, R (k_e), includes R(1), R(2), R(4), R(5), R(6), R(8), R(9), R(11), R(12), R(13), R(14), R(16) and R(17) based on all k_e values indicated in Table 1-2. The PDSCH reception set, R(1), corresponds to PDSCH receptions, K0=5&R0_3, K0=1&R1_0 and K0=2&R2_1 since k_e=1 is only associated with the combination (k=1, k_offset=0) (see Table 1-2) and thus the PDSCH reception set, R(1), corresponds to R_k_offset(0). The PDSCH reception set, R(5), corresponds to PDSCH receptions, K0=5&R0_3, K0=1&R1_0, K0=2&R2_1, K0=1&R0_0, since k_e=5 is simultaneously associated with the combination (k=1, k_offset=4) and (k=5, k_offset=0). Thus, the PDSCH reception set, R(5), corresponds to the union of R_k_offset(4) and R_k_offset(0). Similarly, other PDSCH reception sets, R(k_e), can be associated with corresponding PDSCH receptions as shown in Table 3-2.

TABLE 3-2

| PDSCH reception set R(k_e) associated with k_e | |
|---|---|
| R(1) | K0 = 5&R0_3, K0 = 1&R1_0, K0 = 2&R2_1 |
| R(2) | K0 = 4&R0_2, K0 = 1&R2_0 |
| R(4) | K0 = 2&R0_1 |
| R(5) | K0 = 5&R0_3, K0 = 1&R1_0, K0 = 2&R2_1, K0 = 1&R0_0 |
| R(6) | K0 = 4&R0_2, K0 = 1&R2_0 |
| R(8) | K0 = 5&R0_3, K0 = 1&R1_0, K0 = 2&R2_1, K0 = 2&R0_1 |
| R(9) | K0 = 4&R0_2, K0 = 1&R2_0, K0 = 1&R0_0 |
| R(11) | K0 = 2&R0_1 |
| R(12) | K0 = 1&R0_0 |
| R(13) | K0 = 5&R0_3, K0 = 1&R1_0, K0 = 2&R2_1 |
| R(14) | K0 = 4&R0_2, K0 = 1&R2_0 |
| R(16) | K0 = 2&R0_1 |
| R(17) | K0 = 1&R0_0 |

Implementation 4

This embodiment provides a simplified scheme to determine an association between the element of extended K1 set (K1_e set) for PDSCH-to-HARQ_feedback timing and the PDSCH reception set. Although the implementation is described to determine the association between the element of the extended K1 set (K1_e set) for the PDSCH-to-HARQ_feedback timing and the PDSCH reception set, the implementation can be applied to determine the association between the element of the extended K1 set (K1_e set) for the PDSCH-to-HARQ_feedback timing and the SLIV set.

In this implementation, the extended K1 set is indicated as K1_e set and the complementary set of K1 set corresponding to the extended K1 set (K1_e) is indicated as K1'. The complementary set, K1' set, includes elements of the extended K1 set without including the elements included in the K1 set. For a single DCI scheduling multiple PDSCHs receptions, all the PDSCH receptions or SLIVs other than the last PDSCH reception in a row index in the TDRA table which can indicate multiple PDSCH receptions or SLIVs belong to the set of PDSCH reception R' and all the PDSCH receptions in the TDRA table belong to the PDSCH reception set R.

According to the set of K1', R' and R, for generating semi-static HARQ-ACK codebook for a single DCI scheduling a single PDSCH or PDSCH repetition can be reused to generate semi-static HARQ-ACK codebook for a single DCI scheduling multiple PDSCH receptions. However, for generating semi-static HARQ-ACK codebook for a single DCI scheduling multiple PDSCH receptions, the element of the K1' set is associated with the PDSCH reception set or SLIVs set of R' in the procedure to determine a set of occasions for candidate PDSCH receptions and the element of the K1 set is associated with the PDSCH reception set R to determine a set of occasions for candidate PDSCH receptions when the procedure of generating semi-static HARQ-ACK codebook for a single DCI scheduling a single PDSCH or PDSCH repetition is reused.

For example, in Table 1-1, the PDSCH reception set, R, includes all the PDSCH receptions in the TDRA table and R={K0=1&R0_0, K0=2&R0_1, K0=4&R0_2, K0=5&R0_3, K0=1&R1_0, K0=1&R2_0, K0=2&R2_1}. The PDSCH reception set, R', includes all the PDSCH receptions except the last PDSCH reception in each row within the TDRA table and thus R'={1(0=1&R0_0, K0=2&R0_1, K0=4&R0_2, K0=1&R2_0}. As discussed in the implementation 1, the set of K1={1, 5, 8, 13} and K1_e={1, 2, 4, 5, 6, 8, 9, 11, 12, 13, 14, 16, 17}. Thus, the complementary set of K1 set corresponding to the extended K1 set, K1' is expressed as K1'={2, 4, 6, 9, 11, 12, 14, 16, 17}. Therefore, each element of K1' is associated with the set of PDSCH reception of R' and the other element of K_e associated with the set of PDSCH reception of R when k_e=1, 5, 8, 13.

FIG. 1 shows an example of a wireless communication method (e.g., method 100) based on some implementations of the disclosed technology. At step 110, a user device obtains a parameter set used to determine a feedback timing, the parameter set including N elements. The parameter set corresponds to the K1 set as discussed in the implementations 1-4. At step 120, the parameter set is modified by the user device to include M elements, M being greater than N, based on a time domain resource assignment table that includes information on multiple physical downlink shared channel receptions, whereby N and M are positive integers. The modified parameter set corresponds to the extended K1 set.

In some implementations, the modifying the parameter set is based on slot offset value set. In some implementations, an element (k_offset) of the slot offset value set indicates a slot offset between a physical downlink shared channel reception (Rr_x) and the last physical downlink shared channel reception that are with a same row index of the time domain resource assignment table. The parameter set is a subset of a modified parameter set.

In some implementations, the M elements included in a modified parameter set correspond to all possible sums of an element of the slot offset value set and an element of the parameter set. In some implementations, the modifying the parameter set is further based on a maximum slot offset value among the slot offset values, a minimum value among the N elements, and a maximum value among the N elements. In some implementations, a modified parameter set includes all integer values that are between the minimum value among the N elements and a sum of the maximum slot offset value and the maximum value among the N elements.

In some implementations, the method 100 further comprises generating a semi-static hybrid automatic repeat request acknowledgement (HARQ-ACK) codebook based on the modified parameter set. Each of the M elements of an modified parameter set is associated with a set of start and length indicators (SLIVs) or a set of physical downlink shared channel (PDSCH) receptions. The M elements of the modified parameter set and one of the set of SLIVs or the set of PDSCH receptions are used to determine a set of occasions for candidate PDSCH receptions.

In some implementations, the method 100 further comprises determining an association between an element of the modified parameter set and the set of SLIVs or the set of PDSCH receptions. The element (k_offset) of the slot offset value set is associated with a physical downlink shared channel reception set (R_k_offset(k_offset)) that includes the physical downlink shared channel reception (Rr_x). The modified parameter set includes elements (k_e), each element (k_e) of the modified parameter set corresponding to a sum of an element (k_offset) of the slot offset value set and an element (k) of the parameter set and wherein an element (k_e) of the modified parameter set is associated with one or more combinations consisting of an element (k_offset) of the slot offset value set and an element (k) of the parameter set. The element (k_e) of the modified parameter set is associated with a physical downlink shared channel reception set that corresponds to a union of all the physical downlink shared channel reception set associated with the element (k_offset) of the slot offset value set that is associated with the element (k_e) of the modified parameter set.

In some implementations, the method 100 further comprises: obtaining a complementary parameter set corresponding to a modified parameter set by excluding elements of the parameter set from elements of the modified parameter set. In some implementations, the method 100 further comprises determining an association between an element of the complementary parameter set and a physical downlink channel reception set that includes all physical downlink channel receptions except a last physical downlink channel reception in each row of the time domain resource assignment table. In some implementations, the method 100 further comprises determining an association between an element of the parameter set based on another physical downlink channel reception set that includes all physical downlink channel receptions included in the time domain resource assignment table.

In the descriptions above, the last physical downlink shared channel reception corresponds to a physical downlink shared channel reception whose order is the last in the time domain among physical downlink shared channel receptions with the row index of the time domain resource assignment table.

In some implementations, a communication apparatus comprising a processor configured to implement a method 100 can be provided. In some implementations, a computer readable medium having code stored thereon, the code, when executed, causing a processor to implement a method 100 can be provided.

The implementations as discussed above will apply to a wireless communication. FIG. 2 shows an example of a wireless communication system (e.g., a 5G or NR cellular network) that includes a BS 220 and one or more user equipment (UE) 211, 212 and 213. In some embodiments, the UE may be, for example, a smartphone, a tablet, a mobile computer, a machine to machine (M2M) device, an Internet of Things (IoT) device, and so on and configured to perform the implementations of the disclosed technology. In some implementations, the UEs access the BS (e.g., the network) to transmit a semi-static hybrid automatic repeat request acknowledgement (HARQ-ACK) codebook generated by the UE based on some implementations of the disclosed technology. The BS then enables subsequent communication (241, 242, 243) from the BS to the UEs.

Figure 3:
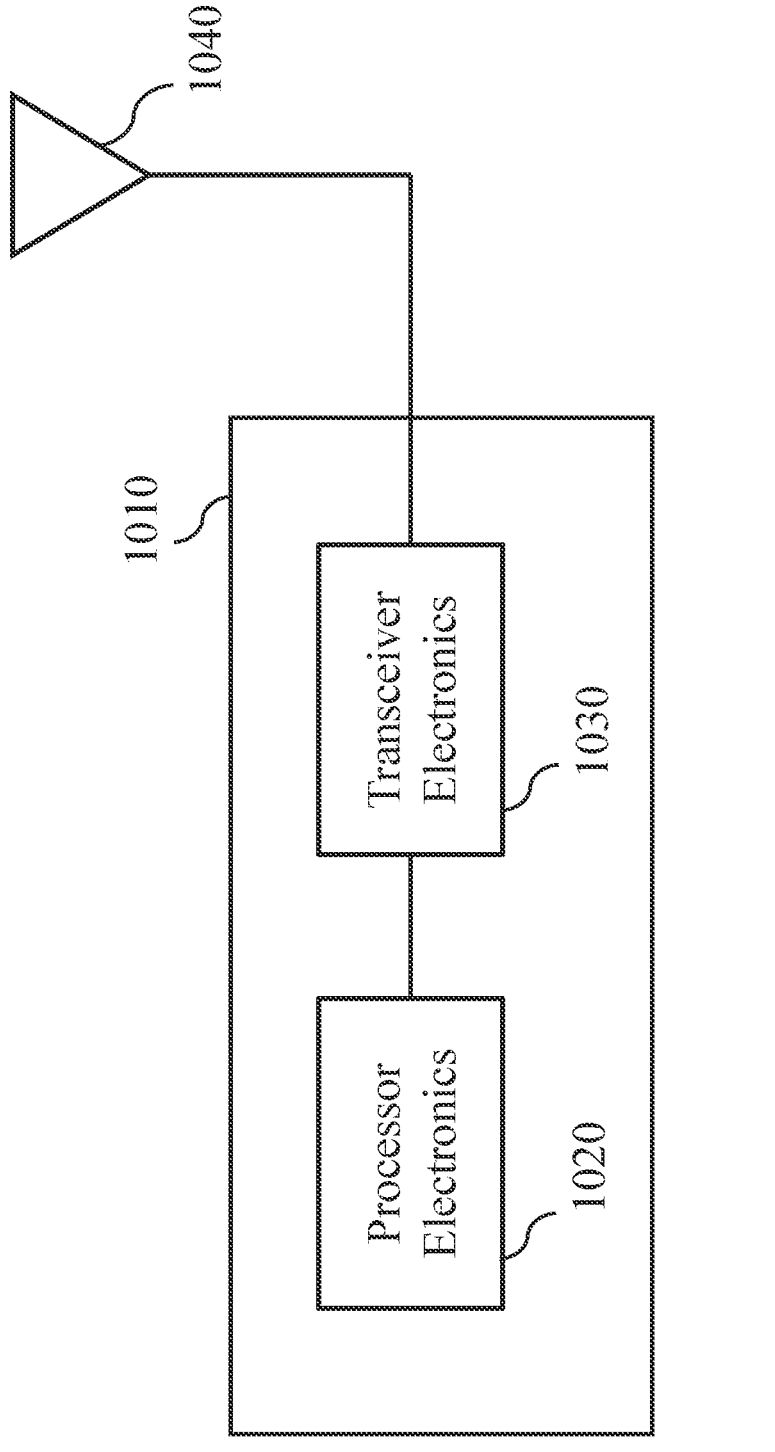
FIG. 3 shows an example of a block diagram of a portion of an apparatus based on some implementations of the disclosed technology.

FIG. 3 shows an example of a block diagram representation of a portion of an apparatus. An apparatus 1010 such as a base station or a user device which may be any wireless device (or UE) can include processor electronics 1020 such as a microprocessor that implements one or more of the techniques presented in this document. The apparatus 1010 can include transceiver electronics 1030 to send and/or receive wireless signals over one or more communication interfaces such as antenna 1040. The apparatus 1010 can include other communication interfaces for transmitting and receiving data. The apparatus 1010 can include one or more memories (not explicitly shown) configured to store information such as data and/or instructions. In some implementations, the processor electronics 1020 can include at least a portion of transceiver electronics 1030. In some embodiments, at least some of the disclosed techniques, modules or functions are implemented using the apparatus 1010.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, the method comprising:

obtaining, by a user device, a parameter set used to determine a feedback timing, the parameter set including N elements;

modifying the parameter set to include M elements based on a slot offset value set, M being greater than N, based on a time domain resource assignment table that includes information on multiple physical downlink shared channel receptions, whereby N and M are positive integers; and obtaining a physical downlink shared channel reception set based on a modified parameter set, wherein the physical downlink shared channel reception set includes sub-reception sets, each sub-reception set corresponding to an element of the modified parameter set;

wherein a sub-reception set corresponding to an element (k_e) of the modified parameter set corresponds to a union of all of physical downlink shared channel receptions, each physical downlink shared channel reception being associated with an element (k_offset) of the slot offset value set; and wherein the element (k_offset) of the slot offset value set is associated with the element (k_e) of the modified parameter set.

2. The method of claim 1, wherein an element (k_offset) of the slot offset value set indicates a slot offset between a physical downlink shared channel reception (Rr_x) and a last physical downlink shared channel reception that are with a same row index of the time domain resource assignment table.

3. The method of claim 2, wherein the element (k_offset) of the slot offset value set is associated with the physical downlink shared channel reception set.

4. The method of claim 2, wherein the last physical downlink shared channel reception corresponds to a physical downlink shared channel reception whose order is the last in the time domain among physical downlink shared channel receptions with the row index of the time domain resource assignment table.

5. The method of claim 1, wherein the parameter set is a subset of the modified parameter set.

6. The method of claim 1, wherein the M elements included in a modified parameter set correspond to all possible sums of an element of the slot offset value set and an element of the parameter set.

7. The method of claim 1, wherein the modifying the parameter set is further based on a maximum slot offset value among slot offset values, a minimum value among the N elements, and a maximum value among the N elements.

8. The method of claim 7, wherein the modified parameter set includes all integer values that are between the minimum value among the N elements and a sum of the maximum slot offset value and the maximum value among the N elements.

9. The method of claim 1, further comprising:
generating a semi-static hybrid automatic repeat request acknowledgement (HARQ-ACK) codebook based on the modified parameter set.

10. The method of claim 1, wherein each of the M elements of the modified parameter set is associated with a set of start and length indicators (SLIVs) or the physical downlink shared channel reception set.

11. The method of claim 10, wherein the M elements of the modified parameter set and one of the set of SLIVs or the physical downlink shared channel reception set are used to determine a set of occasions for candidate PDSCH receptions.

12. The method of claim 10, further comprising:
determining an association between the element (k_e) of the modified parameter set and the set of SLIVs or the physical downlink shared channel reception set.

13. The method of claim 12, wherein the modified parameter set includes elements (k_e), each element (k_e) of the modified parameter set corresponding to a sum of an element (k_offset) of the slot offset value set and an element (k) of the parameter set and wherein an element (k_e) of the modified parameter set is associated with one or more combinations consisting of an element (k_offset) of the slot offset value set and an element (k) of the parameter set.

14. The method of claim 1, further comprising:
obtaining a complementary parameter set corresponding to the modified parameter set by excluding elements of the parameter set from elements of the modified parameter set.

15. The method of claim 14, further comprising:
determining an association between an element of the complementary parameter set and a physical downlink channel reception set that includes all physical downlink channel receptions except a last physical downlink channel reception in each row of the time domain resource assignment table.

16. The method of claim 14, further comprising:
determining an association between an element of the parameter set based on another physical downlink channel reception set that includes all physical downlink channel receptions included in the time domain resource assignment table.

17. A communication apparatus comprising at least one processor configured to implement a method comprising:
obtaining a parameter set used to determine a feedback timing, the parameter set including N elements;
modifying the parameter set to include M elements based on a slot offset value set, M being greater than N, based on a time domain resource assignment table that includes information on multiple physical downlink shared channel receptions, whereby N and M are positive integers; and
obtaining a physical downlink shared channel reception set based on a modified parameter set,
wherein the physical downlink shared channel reception set includes sub-reception sets, each sub-reception set corresponding to an element of the modified parameter set;
wherein a sub-reception set corresponding to an element (k_e) of the modified parameter set corresponds to a union of all of physical downlink shared channel receptions, each physical downlink shared channel reception being associated with an element (k_offset) of the slot offset value set; and
wherein the element (k_offset) of the slot offset value set is associated with the element (k_e) of the modified parameter set.

18. A non-transitory computer readable medium having code stored thereon, the code, when executed, causing at least one processor to implement a method comprising:
obtaining a parameter set used to determine a feedback timing, the parameter set including N elements; and
modifying the parameter set to include M elements based on a slot offset value set, M being greater than N, based on a time domain resource assignment table that includes information on multiple physical downlink shared channel receptions, whereby N and M are positive integers; and
obtaining a physical downlink shared channel reception set based on a modified parameter set,
wherein the physical downlink shared channel reception set includes sub-reception sets, each sub-reception set corresponding to an element of the modified parameter set;
wherein a sub-reception set corresponding to an element (k_e) of the modified parameter set corresponds to a union of all of physical downlink shared channel receptions, each physical downlink shared channel reception being associated with an element (k_offset) of the slot offset value set; and
wherein the element (k_offset) of the slot offset value set is associated with the element (k_e) of the modified parameter set.

\* \* \* \* \*